Aug. 24, 1965   C. E. RANSLEY   3,202,600
CURRENT CONDUCTING ELEMENT FOR ALUMINUM REDUCTION CELLS
Original Filed May 23, 1957   8 Sheets-Sheet 2

INVENTOR
CHARLES ERIC RANSLEY

BY *James E. Toomey*
ATTORNEY

Aug. 24, 1965 C. E. RANSLEY 3,202,600
CURRENT CONDUCTING ELEMENT FOR ALUMINUM REDUCTION CELLS
Original Filed May 23, 1957 8 Sheets-Sheet 3
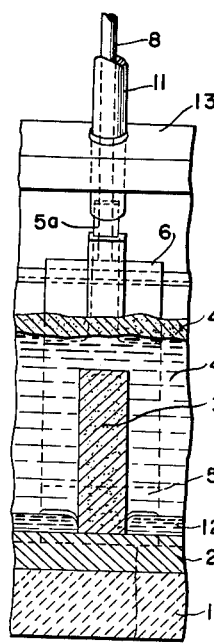
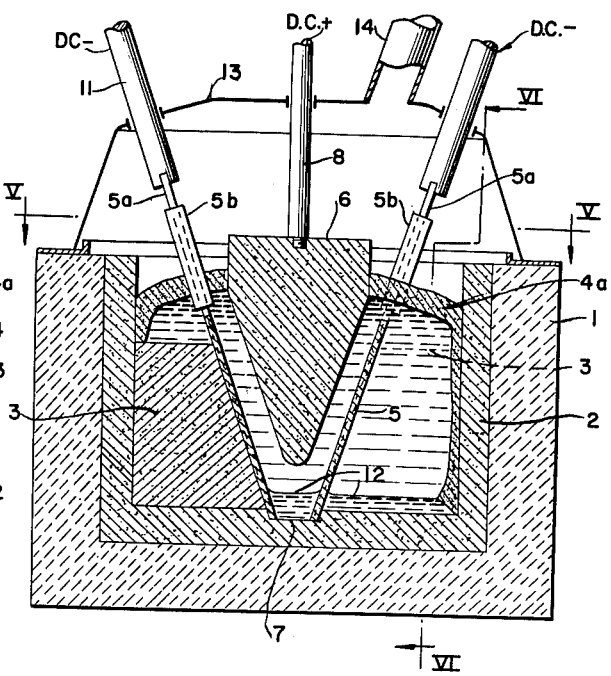
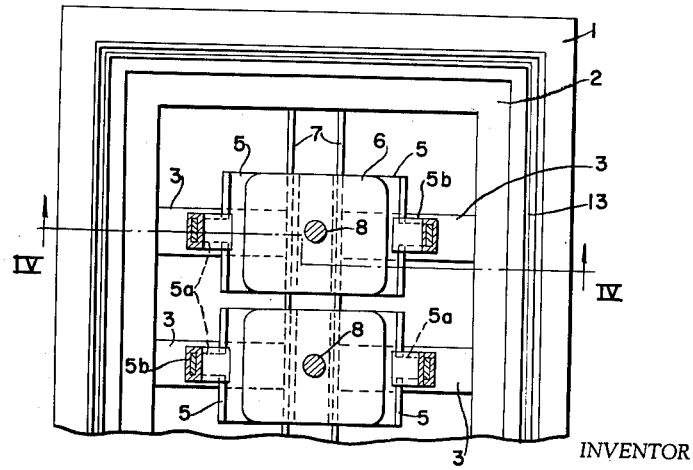
INVENTOR
CHARLES ERIC RANSLEY
BY James E. Toomey
ATTORNEY Aug. 24, 1965                C. E. RANSLEY                3,202,600
        CURRENT CONDUCTING ELEMENT FOR ALUMINUM REDUCTION CELLS
Original Filed May 23, 1957                              8 Sheets-Sheet 4
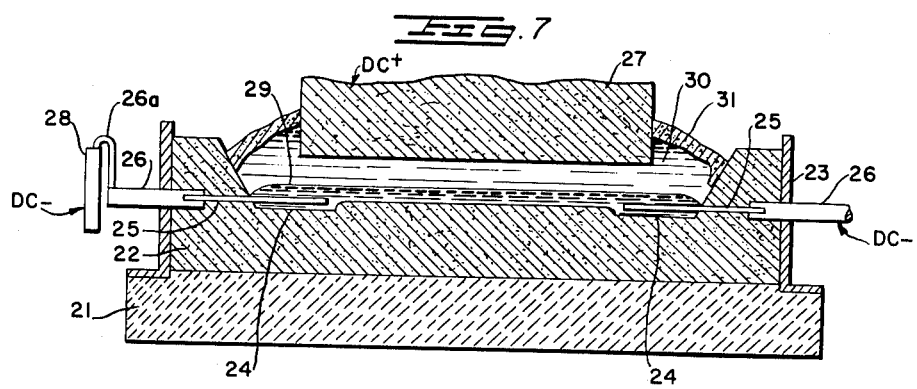
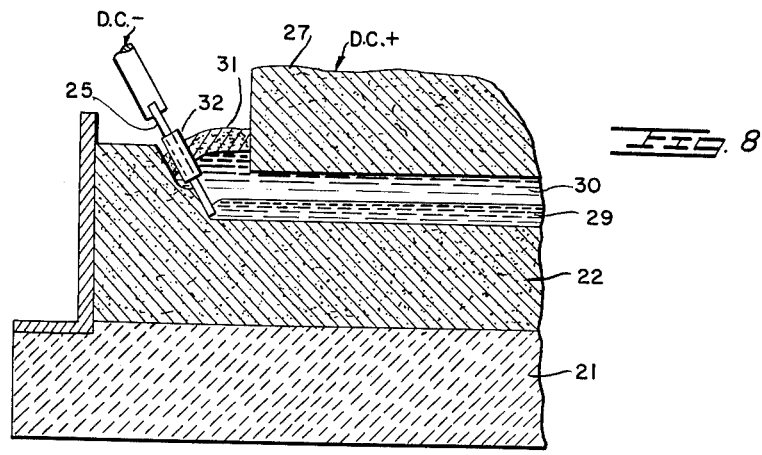
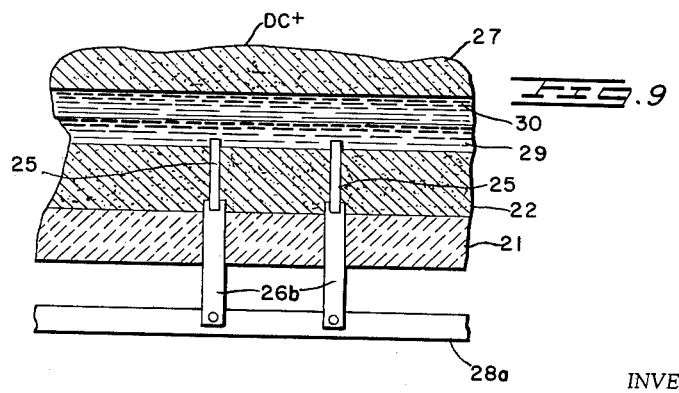
INVENTOR
CHARLES ERIC RANSLEY
BY *James E. Toomey*
ATTORNEY

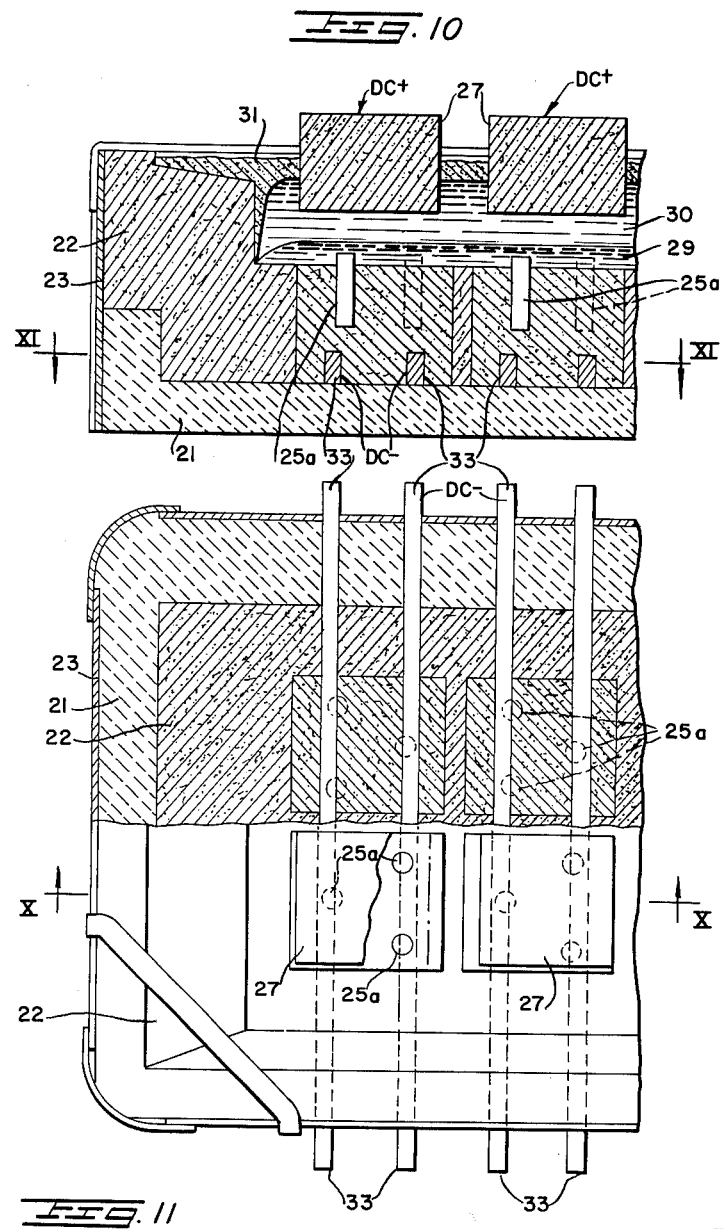

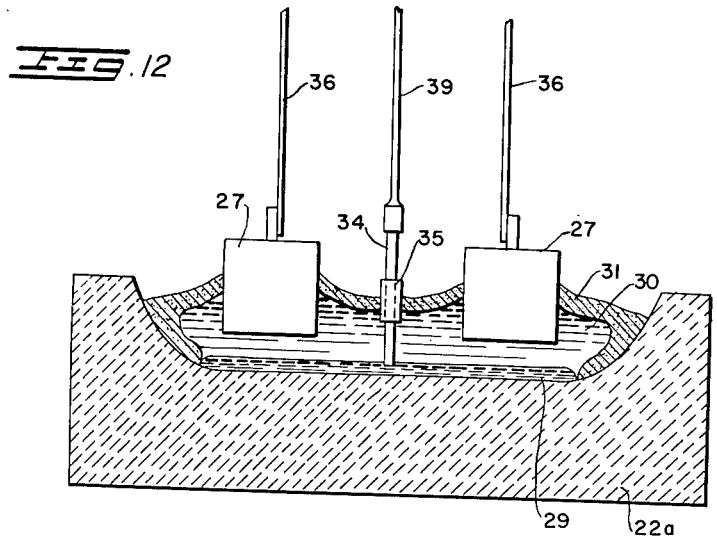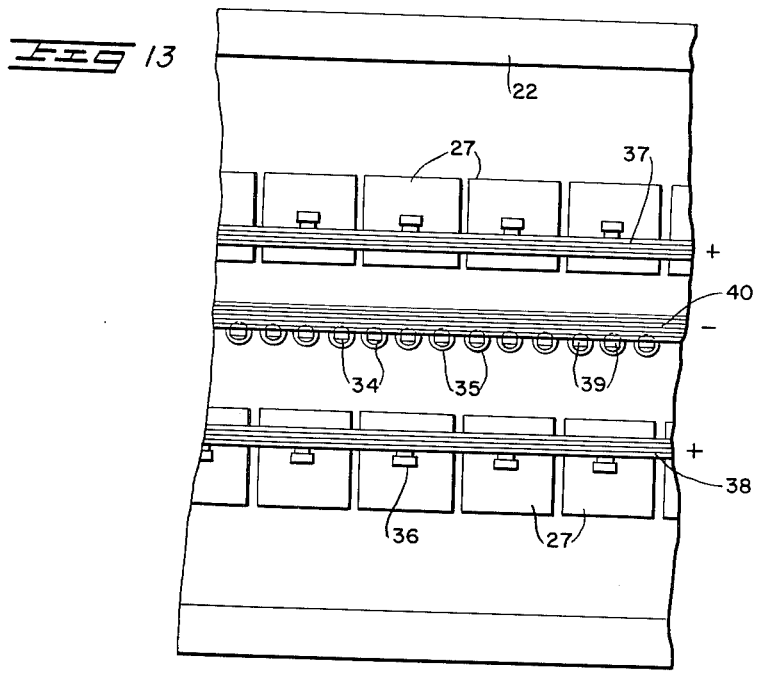

Aug. 24, 1965
C. E. RANSLEY
3,202,600
CURRENT CONDUCTING ELEMENT FOR ALUMINUM REDUCTION CELLS
Original Filed May 23, 1957
8 Sheets-Sheet 7
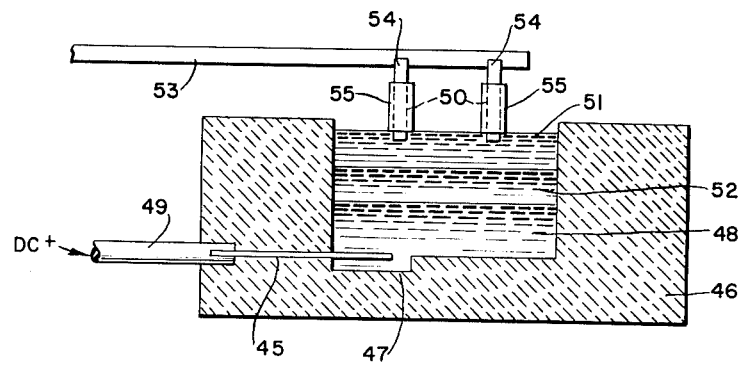
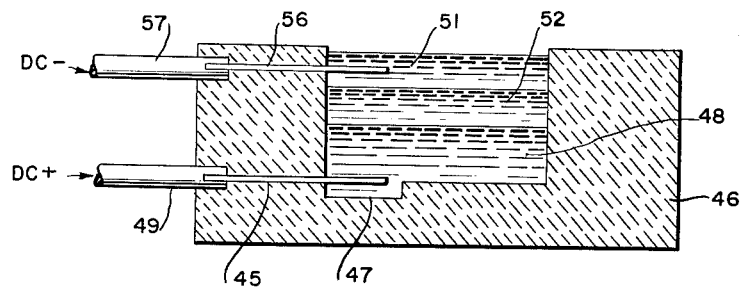
INVENTOR
CHARLES ERIC RANSLEY
BY *James E. Toomey*
ATTORNEY

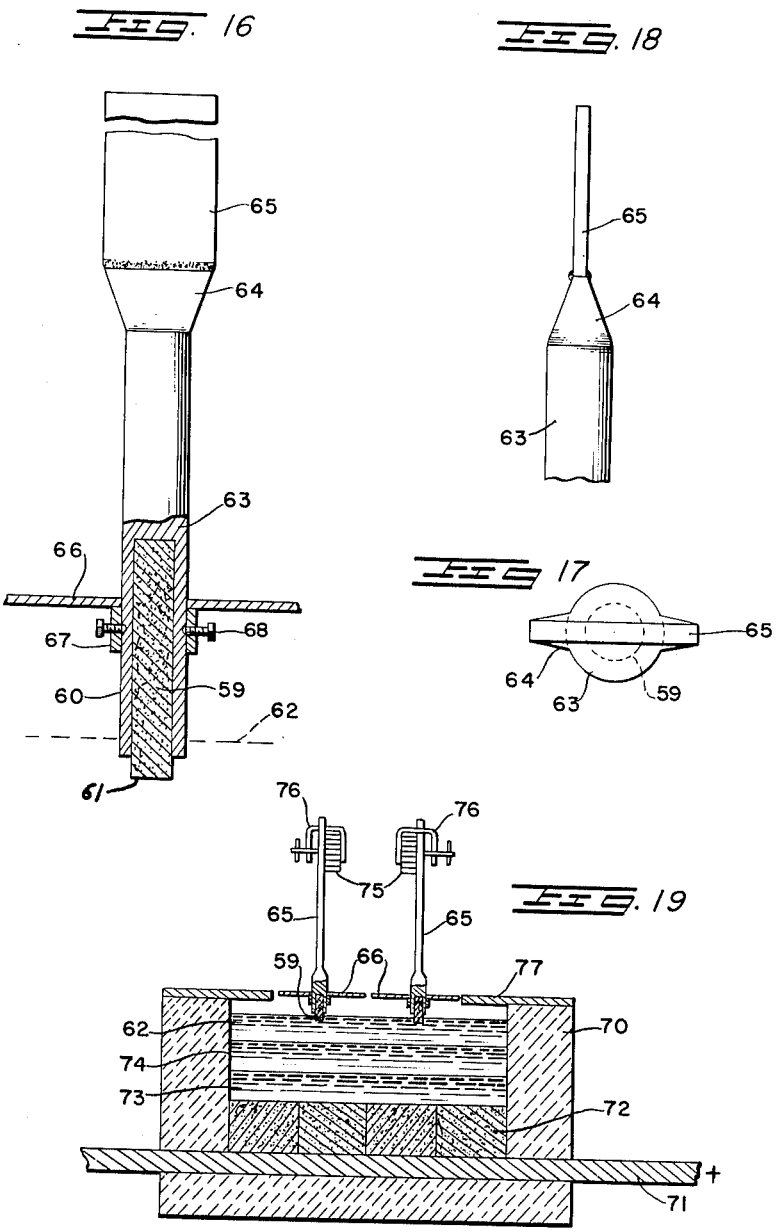

United States Patent Office 3,202,600
Patented Aug. 24, 1965

3,202,600
CURRENT CONDUCTING ELEMENT FOR
ALUMINUM REDUCTION CELLS
Charles Eric Ransley, Chesham Bois, England, assignor
to The British Aluminium Company Limited, London,
England, a company of Great Britain
Original application May 23, 1957, Ser. No. 660,994, now
Patent No. 3,028,324, dated Apr. 3, 1962. Divided and
this application June 12, 1961, Ser. No. 125,318
Claims priority, application Great Britain, May 4, 1951,
10,548/51, 10,549/51; Aug. 3, 1951, 18,490/51; Apr.
15, 1952, 9,474/52; Jan. 14, 1954, 1,154/54, 1,155/54;
Mar. 10, 1955, 7,135/55, 7,136/55, 7,137/55; May 1,
1957, 13,948/57
13 Claims. (Cl. 204—279)

This application is a division of application Serial No. 660,994, filed May 23, 1957 (now Patent No. 3,028,324).

Application 660,994 is a continuation-in-part of my copending applications Serial Number 286,709, filed May 8, 1952; Serial Number 481,611, filed January 13, 1955; Serial Number 481,927, filed January 14, 1955; Serial Number 569,736 filed March 6, 1956; Serial Number 569,737, filed March 6, 1956; Serial Number 570,233, filed March 8, 1956 and Serial Number 613,006, filed October 1, 1956, said application Serial Number 613,006 being a continuation-in-part of said Serial Numbers 286,709; 481,611; 481,927; and 569,737 and application Serial Number 284,761, filed April 28, 1952. Each of the above mentioned parent applications except 660,994 is now abandoned.

This invention relates to electrolytic cells for the production of metals, e.g. aluminum. The expression "electrolytic cell," as used hereinafter, is meant in include both reduction cells for the production of aluminum and three-layer cells for the refining or purification of aluminum. More particularly this invention is concerned with electrolytic cells embodying one or more current-conducting elements which may constitute at least a part of the cathodes of reduction cells or current-conducting elements for taking part in the supply of electrolyzing current to a body of molten metal and at least partially exposed to the latter either in a reduction cell or in a purification cell. Additionally, this invention is concerned with electrolytic cell structure involving the use of such current-conducting elements and methods of operation of such cells.

Both of the above-mentioned cells, that is, the reduction cell and the three-layer cell are of the kind in which it is necessary to pass electrolyzing current through a body of electrolyte or flux. In the case of reduction cells the current passes between an anode and a cathode having their operative faces in contact with the body of electrolyte which has dissolved therein a compound of the metal. The cathode may be the pool of molten metal which collects on the floor of the cell or it may be a solid electrode immersed at least partially in the electrolyte. Such an electrode may extend into the pool of molten metal in which case the latter is also cathodic. In the case of three-layer purification cells the current passes between the pool of aluminum alloy forming the bottom layer in the cell and the layer of purified molten aluminum forming the top layer in such a cell through the body of electrolyte or flux forming the intermediate layer which is in contact with both the top and bottom layers. Hitherto no material has been found to have the chemical and electrical properties required of a solid electrode constituting the cathode in a reduction cell and further the arrangements at present made for leading the current into the body of molten metal in a reduction cell or the bodies of metal in a three-layer cell are not entirely satisfactory and this is particularly true of the reduction cell where relatively substantial losses in efficiency and increases in constructional and maintenance costs are directly traceable to the nature of the current leads which have to be employed.

For example, aluminum reduction cells which are at present in commercial use are employed to effect the electrolysis of an aluminum compound, generally aluminum oxide, while it is dissolved in a suitable flux which is mainly cryolite and has a fusion point usually in excess of 900° C. Since the cells therefore must be operated at a temperature in the neighborhood of 1000° C., their construction has always presented considerable problems. The flux, for example, is very reactive towards metals and towards normal refractory materials. Thus difficulty is experienced in constructing a durable receptacle or container for the molten flux and there is even greater difficulty in finding suitable materials for the construction of a solid cathodic electrode in contact with molten flux and molten metal and the current-conducting elements which are in contact with the molten metal.

Carbon is the only material which has hitherto been found to be capable of use for the purposes mentioned above, this being employed both for lining the receptacle which is to contain the electrolyte or flux and for the construction of the current-conducting elements. However, the use of carbon entails a number of very considerable disadvantages, not the least of which is the fact that the floor of the cell lining which supports the molten metal must, in practice, be arranged in a substantially horizontal plane. With such arrangement the floor space occupied by a single cell is quite extensive and the cost of constructing such large cells is considerable. The necessity for this horizontal arrangement arises from the fact that molten aluminum does not wet carbon. Unless this arrangement be adopted the current efficiency of the cell is very low.

In the case of reduction cells, the use of carbon to conduct current to the molten metal cathode and the horizontal arrangement of the cell floor entail a number of disadvantages in operating the cell. For example, the gradual penetration of molten flux or flux constituents into the cell floor causes this to disintegrate and shortens its useful life. Deposits are formed on the surface of the carbon which increase the voltage drop across the cell and reduce the efficiency of the latter. Satisfactory electrical contact between the carbon lining and the electrical current supply conductors, e.g. cathode collector bars, is difficult to achieve and there are appreciable losses also due to the electrical resistance of the carbon itself.

The horizontal construction referred to hereinabove has the further disadvantage that the inherent turbulence of the molten metal cathode requires a high inter-polar distance to ensure against contact of the molten metal cathode with the anode and with the consequent production of excess heat which has to be dissipated.

Accordingly, it is the primary purpose and object of this invention to provide improved electrolytic cells for the production of aluminum, e.g. reduction cells and refining or purification cells, which overcome or substantially minimize the disadvantages as mentioned hereinabove.

Another object is to provide improved electrolytic cells for the production of aluminum wherein the cathode is solid.

Another object is to provide improved electrolytic cells for the production of aluminum, e.g. reduction and refining cells, wherein the cathodic electrical system involves the use of current-conducting elements giving rise to longer life and reduced voltage drop.

Another object is to provide novel current-conducting elements for use in electrolytic cells.

Another object is to provide methods for making current-conducting elements.

Another object is to provide a novel aluminum reduction cell involving the use of a solid cathode which is inclined.

Another object is to provide improved reduction and refining cells for the production of aluminum wherein the cathodic electrical system does not involve, as an element therein, a carbon or graphite member.

Another object is to provide an improved method of operating cells for the production of aluminum.

Another object is to provide an improved method of operating cells for the production of aluminum involving the use of a sodium chloride-containing electrolyte.

These and other objects and advantages of this invention will be apparent from the following description thereof taken in conjunction with the drawings wherein:

FIGURE 4 is a view similar to that of FIGURE 2 showing an alternative construction of reduction cell, this section being taken on the line IV—IV of FIGURE 5;

FIGURE 5 is a section taken on the line V—V of FIGURE 4, the contents of the cell, namely, the molten and solidified flux or electrolyte and the pool of molten metal, being omitted for purpose of clarity;

FIGURE 6 is a fragmentary section taken on the line VI—VI of FIGURE 4;

FIGURE 7 is a transverse vertical section of another construction of electrolic reduction cell as it appears during the operation thereof;

FIGURE 8 is a transverse fragmentary vertical section of another construction of electrolytic reduction cell as it appears during the operation thereof;

FIGURE 9 is a transverse fragmentary vertical section of still a further construction of electrolyte reduction cell as it appears during the operation thereof;

FIGURE 10 is a fragmentary longitudinal vertical section taken on the line X—X of FIGURE 11 and showing a further construction of electrolytic reduction cell as it appears during the operation thereof;

FIGURE 11 is a fragmentary composite view of the left-hand end of the reduction cell shown in FIGURE 10, the upper part of the figure being a section taken on the line XI—XI of FIGURE 10, and the lower part being a plan view with the body of flux in the layer of molten aluminum omitted for purpose of clarity and part of one of the anodes broken away;

FIGURE 12 is a transverse vertical section similar to FIGURE 8 illustrating a further modification of electrolytic reduction cell;

FIGURE 13 is a fragmentary plan view of the reduction cell shown in FIGURE 12, the flux and molten aluminum layer being omitted for purpose of clarity.

FIGURE 14 is a vertical section of a three-layer refining or purification cell;

FIGURE 15 is a vertical section of a three-layer refining or purification cell showing an alternative arrangement of the current leads supplying the top layer;

FIGURE 16 is an elevational view, partially broken away, showing a sheathed electrode in its position of use;

FIGURE 17 is a plan view of the electrode shown in FIGURE 16;

FIGURE 18 is a fragmentary elevational view, taken from the right side of FIGURE 16 and showing the upper part of the sheath; and FIGURE 19 is a transverse vertical section of a three-layer refining or purification cell employing the sheathed electrode shown in FIGURE 16.

Figure 1:
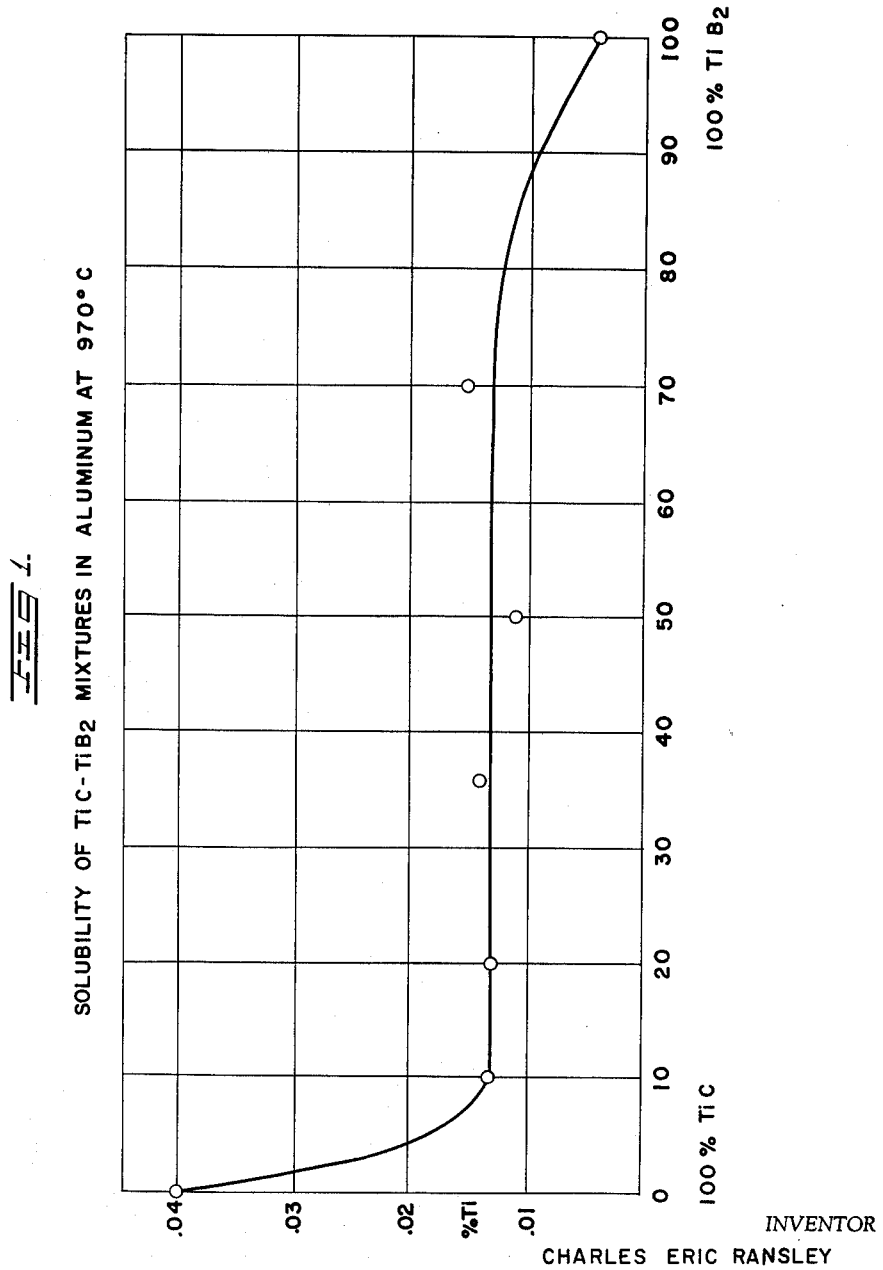
FIGURE 1 is a diagram showing the amount of titanium dissolved by aluminum at 970° C. in contact with materials ranging in composition from 100% TiC to 100% $TiB_2$.

With a view to overcoming or substantially minimizing the disadvantages in prior art cells and cell operation, as mentioned hereinbefore, there has been a long sought need for a new current-conducting element which may be exposed in part to molten aluminum, molten aluminum-containing metals, electrolyte or flux and temperatures and atmospheres incident to the operation of electrolytic cells without material adverse effect. It has been concluded that the properties required in an ideal current-conducting element may be summarized as follows:

(1) It should have a good electrical conductivity.

(2) It must not react with nor be soluble in either molten aluminum or, under cathodic conditions, in molten flux or electrolyte, at least to any appreciable extent, at the operating temperature of the cell. The solubility of the material in molten aluminum is an important consideration as it determines both the useful life of the current-conducting element and the degree of contamination of the aluminum produced through the agency of such current-conductive element.

(3) It should be capable of being wetted by molten aluminum. The importance of "wettability" had not previously been recognized clearly, but my research demonstrated that immediate advantage would follow if a material with this property could be developed.

(4) It must be cheap enough to be fabricated in the required form economically.

(5) It should have high stability under the conditions existing at the cathode of the cell, that is, it should possess good resistance to penetration by the molten metal and to cracking.

(6) It should have a low thermal conductivy.

(7) It should have a good mechanical strength and resistance to thermal shock.

(8) Where the material of the current-conducting element is to be exposed to the exterior of the cell, it should have a good resistance to oxidation and to gases to which it is exposed. Normally the conditions existing at the cathode of a cell are highly reducing and in certain applications therefor this requirement is not essential.

As the result of many experiments, it has been found that materials which exhibit all or substantially all of the properties hereinabove set forth are the carbides and borides of titanium, zirconium, tantalum and niobium and mixtures thereof.

At least the operative face or faces of the current-conducting elements, i.e., the face or faces exposed to the deleterious conditions subsisting during the operation of the cell, e.g., the face or faces exposed to the molten metal, may consist essentially of but one of the materials specified, or, alternatively, may consist essentially of more than one such material in varying proportions. In most applications, it is preferred that the whole of the current-conducting elements should consist essentially of one or more of such materials. The expression "consist essentially," as used hereinafter in the specification and claims, means that that portion of the element made of one or more of the carbides and borides referred to above does not contain the substances in amounts sufficient materially to affect the desirable characteristics of the current-conducting element although other substances may be present in minor amounts which do not materially affect such desirable characteristics, for example small proportions of oxygen or iron in titanium boride. It is also preferred that the refractory materials in the current-conducting elements be essentially free from elements or compounds which would lead to undesirable contamination of the aluminum produced. Nevertheless, the current-conducting elements embodied in cells according to this invention may contain initially, among others, certain compounds which dissolve out when the element is first put into service, and which do not materially affect the element.

Desirably, that portion of the element consisting essentially of one or more of the above mentioned refractory materials should be composed of at least 90% by weight of such material. The carbides and borides referred to have been found to possess a relatively high electrical conductivity (better than that of carbon), a good resistance to attack by molten flux or electrolyte, a very low solubility in molten aluminum at cell operating temperatures and a resistance to oxidation considerably better than that of carbon. They can be produced in a suitable form with good mechanical properties. Furthermore, it is possible effectively to wet the surface of current-conducting elements made from these materials with molten aluminum under all operating conditions, from which it results that, for the first time, a commercially practicable cell with vertical or inclined electrodes may be constructed. The term "cathode," as applied to solid members, is intended to denote an electrode of sheet, plate, rod or other suitable shape at which metal is produced in a tangible form. In addition, these materials can be connected without great difficulty to a metallic conductor to establish a good mechanical and electrical joint therewith.

Of the carbides and borides referred to above, those preferred at the present time are the compounds of titanium and zirconium since the elements tantalum and niobium are relatively rare and correspondingly expensive.

Accordingly, the present invention provides in an electrolytic cell for the production of aluminum the combination comprising a receptacle defining a chamber adapted to contain a body of molten electrolyte and a body of molten aluminum and an electrical system including at least one anodic current-conducting element extending into said chamber and at least one cathodic current-conducting element extending into said chamber, at least a part of the surface of one of said current-conducting elements being adapted to be exposed to molten aluminum and consisting essentially of a material possessing a low electrical resistivity, a low solubility in molten aluminum and molten electrolyte under cell operating conditions and being wettable by molten aluminum under cell operating conditions.

According to a further feature of the invention an electrolytic cell for the production of aluminum comprises in combination a receptacle defining a chamber adapted to contain a body of molten electrolyte and a body of molten aluminum, an anode extending at least partially within said chamber and a cathodic current-conducting element having at least a part of its surface exposed to the interior of said chamber and spaced from said anode, at least said part of said surface consisting essentially of a material possessing a low electrical resistivity, a low solubility in molten aluminum and molten electrolyte under cell operating conditions and being wettable by molten aluminum under cell operating conditions.

It is also a feature of the invention that said material referred to in the preceding two paragraphs has an electrical resistivity lower than carbon and a solubility in molten aluminum and molten electrolyte under cell operating conditions at least as low as titanium carbide or zirconum carbide.

Advantageously said material is titanium boride.

A current-conducting element consisting essentially of one or more of carbides and borides referred to may be employed with advantage in accordance with this invention to establish electrical connection with the body of molten aluminum-containing metal in a cell of orthodox construction, its use greatly reducing the voltage drop which would otherwise be experienced. Additionally, as mentioned above, such a current-conducting element may be used satisfactorily as a cathode disposed in a vertical or inclined position. There are considerable advantages to be gained by constructing a cell with a cathode or cathodes at least a part of the operative surface of which is so disposed.

The cathode may be so arranged in the cell that its operative face or faces, is or are, disposed at a relatively large angle, i.e., 60 to 90° to the horizontal, the deposited aluminum continuously draining down the face or faces concerned, preferably to collect in a pool in contact with the lower part of the cathode from which pool it may be withdrawn from time to time in the usual manner. If desired, the pool of molten aluminum thus formed may be utilized as part of the current-supply means for the cathode. The operative face or faces of the anode or anodes in a cell embodying inclined cathodes, according to this invention, is or are also disposed at a substantial angle to the horizontal. With reference to anodes, it is to be understood that it is contemplated within the scope of this invention, that such anodes may be of the conventional pre-baked type or of the conventional Soderberg self-baking type.

Due to the inclined or substantially vertical arrangement of the electrodes, the floor space occupied by the cell is very considerably reduced in relation to that which is at present required. Moreover, the electrodes may be arranged to operate within a relatively confined body of molten flux or electrolyte and this may, in turn, be surrounded by solidified flux or electrolyte which may be retained in its desired external shape by a simple wall of steel or other suitable material, the constructions of the cell being thereby considerably cheapened. A further great advantage of the cell construction embodying inclined cathodes according to this invention is that the disposal of the noxious or unpleasant fumes generated during the operation of the cell is considerably simplified, due to the much smaller area over which they are evolved. It will also be appreciated that the cell may be designed in such a way that wasteful loss of heat is reduced to a minimum.

Yet a further advantage which flows from the inclined positioning of the cathode is that surging of the molten aluminum is very much less likely to occur so that the spacing of the anode and cathode may be substantially reduced compared with that adopted in cells are heretofore known and the dissipation of electrical energy energy in the electrolyte correspondingly reduced. One further point of importance may be noted and this is that owing to the relatively high electrical conductivity of the cathode the voltage drop due to the passage of the operating current is less than that experienced in cells of orthodox construction. The effect of sludge formation at the bottom of the cell, which is to cause an undesirable voltage drop at the cathode in the existing horizontal cells, can readily be avoided in the operation of the new type of cell according to this invention. For example, I have constructed an electrolytic reduction cell using a conventional electrolyte with a titanium carbide cathode and a carbon anode, both disposed substantially vertically. The cathode drop was found to be less than 0.2 volt, compared with the customary cathode drop of 0.5 to 0.7 volt encountered in orthodox cells of comparable size, and the current efficiency was also found to be considerably higher than that obtainable in such orthodox cells.

Current-conducting elements for use in electrolytic cells according to this invention can be produced from the carbides and borides referred to having a reasonably low electrical resistivity, i.e., in the range of from about 10 to 120 microhms cm., a low solubility in molten aluminum, i.e. not more than about 0.04% in molten aluminum at about 970° C., a good resistance to attack by the molten electrolyte employed in electrolytic cells for the production and refining of aluminum and a resistance to thermal shock such that the elements will withstand plunging into molten aluminum at 750° C. at a temperature differential not less than 200° C. without cracking. They are thus eminently suitable for use as leads for taking part in the supply of electrolyzing current to a body of molten aluminum in such a cell or a cathodes (or facings for cathodes) in electrolytic reduction cells for the production of aluminum.

With regard to the carbides referred to above, titanium carbide is preferred to zirconium carbide for the purposes in view, not only because it is less expensive to produce but because it has a much higher resistance to oxidation than zirconium carbide. When the latter is employed, in fact, precautions must be taken to insure that it is never exposed to the action of air or oxygen or oxidizing conditions while at a high temperature, e.g. the operating temperature of the cell, for which reason a cathode or current-conducting element composed entirely or consisting essentially of zirconium carbide should be protected, e.g. by protecting it with a sheath of oxidation resistant material before its temperature is raised to any substantial degree. In addition, zirconium carbide requires higher temperatures than does titanium carbide for the carrying out of the method of producing the coherent mass of the carbide having the requisite mechanical strength. For these reasons, the following discussions with regard to carbides will be concerned mainly with the use of titanium carbides but the several steps and procedures detailed in this connection apply also in case of the other carbides, as well as in the case of the bordes, save where a note is given of the necessary modification or where the necessity for protecting the other carbides against oxidation will entail corresponding precautionary measures.

The current-conducting elements, e.g. cathodes, current leads, etc., are preferably prepared by providing the materials in the form of powders of suitable purity and particle size and then subjecting the material to compacting and sintering operations by hot pressing which comprises subjecting the powder, e.g. titanium carbide, to a continuously applied pressure of from about 0.5 to 50 tons per square inch, e.g. 1 ton p.s.i., while raising its temperature to about 1600° to 2700° C., e.g. 2000° C. Preferably the compacting and heating operations are carried out in a protective atmosphere, e.g. hydrogen or in a vacuum. It is preferable to raise the temperature to the maximum value in a relatively short period of time, for example, in less than about 1 hour. The operation may be carried out in a graphite die having a cavity of the appropriate cross-sectional shape, the pressure preferably being applied to the powder by plungers acting on opposite ends of the column of powder and wherein the protective atmosphere is maintained around the die during the heating and cooling periods. Although the above method has been found quite satisfactory in making current-conducting elements, it is contemplated within the scope of the instant invention that other methods may be used, for example, fusing the materials in a high temperature furnace and casting same to desired shape or the use of cold pressing and sintering techniques.

The cold-pressing method involves the cold pressing of the powders, followed by a sintering operation carried out at a temperature between 1100° C. and 2200° C. either in vacuum or in a neutral atmosphere. For example, the material of the element, e.g. titanium carbide, may be provided in particulate or powder form having a mean particle diameter of about 1 to 2 microns with which has been mixed a small portion of a binder, e.g. 1% of paraffin wax dissolved in benzene. The benzene is evaporated off on a water bath, or at a temperature sufficiently high to melt the wax, prior to the compacting operation. The compacting step may be effected by single pressures between male and female dies, either at ordinary temperature or an elevated temperature, and wherein the pressure applied is in the range 0.5 to 50 tons per square inch, e.g. 3 tons per square inch. Alternatively, the powdered mixture may be extruded into the desired shape. If the initial powder has a sufficiently low content of free carbon, it may be directly compacted as above and then pre-fired in vacuum to a temperature of 1100° C. (about 1600° C. for zirconium carbide). It may then be worked by sawing, filing, or like shaping operations to produce an element of appropriate form, although it will be understood that the electrode or element will usually be finally shaped in the compacting operation. The electrode or current-conducting element is then fired in vacuum at an elevated temperature, e.g. where titanium carbide is the material of the element the firing temperature can be about 1600° C. (about 2200° C. for zirconium carbide) although this may be varied according to the density desired in the final product, to produce a robust, sintered element having a porosity of the order of 20% by volume. Such an element is a self-bonded element, i.e. the titanium carbide particles adhere directly to each other, and at such a relatively high porosity the pores are interconnected and capillary paths exist within the element so that the latter may be considered to be permeable.

Generally, the titanium carbide powder of commerce contains about 90% of titanium carbide and 1 to 2% of free carbon, the balance being titanium oxide and titanium nitride in solid solution in the titanium carbide and combined iron. If a powder of this character be treated as above set forth, that is, by cold pressing and sintering under pressures and temperatures such that the element is permeable, the current-conducting element obtained is not always suitable for the purposes intended because the content of free-carbon is not necessarily reduced to a safe level during a sintering operation carried out at a temperature of 1600° C. in vacuum. The use of a higher temperature either in vacuum or in a furnace in which an atmosphere of a neutral gas, such as hydrogen, is maintained, results in improved products but some of these may still have a content of free carbon amounting to 0.6% by weight. It is found that a sintered titanium carbide compact having a porosity such that the element produced is permeable and which contains more than about 0.5% free carbon shatters or disintegrates when wetted by molten aluminum, probably due to penetration of molten aluminum up the capillary paths and internal reaction between the free carbon and aluminum to form aluminum carbide. Such an element would not be suitable for use as a cathode or current lead exposed to molten aluminum in an electrolytic reduction cell for the production of aluminum. However, the difficulty can be overcome by incorporating into the titanium carbide powder being used in the production of the element a suitable proportion of powdered calcined alumina. Preferably, the alumina is added to the commercial titanium carbide powder and the mixture then ball-milled for a relatively long period in the dry state until it is reduced to a mean particle diameter of about 1 to 2 microns. The amount of alumina added depends to some extent upon the content of free carbon in the titanium carbide powder but is usually equivalent to about 2 to 3% of the weight of the titanium carbide employed.

The finely powdered mixture of titanium carbide and calcined alumina is then moistured with a suitable binder, e.g. paraffin wax dissolved in benzene, and the solvent driven off prior to compacting the mass under pressure as set forth above. The firing of the compact obtained is effected in a furnace through which a stream of protective gas, e.g. hydrogen, is passed, the temperature preferably being higher than 1600° C., for example, about 2200° C. (about 2700° C. for zirconium carbide). The finished product contains substantially no free carbon and the residual aluminum therein, whether present as $Al_2O_3$ or $Al_4C_3$, is very small. As an example, a titanium carbide powder initially containing between 1% and 2% by weight of free carbon, when mixed with 2.5% by weight of calcined alumina and treated as above set forth, yielded an element containing only 0.2% by weight of free carbon. Increasing the amount of $Al_2O_3$ added to 3% resulted in an element containing 0.05% by weight of free carbon.

It is preferred that the content of free carbon in the finished element shall be below 0.1% but somewhat higher percentages of free carbon can be tolerated provided that the figure of 0.5% not be exceeded. Current-conducting elements thus prepared by the cold-pressed method from substantially carbon-free titanium carbide will be wetted freely by molten aluminum under cell operating conditions without any tendency to shatter or break up and without any sign of cracks developing.

Current-conducting elements made by the use of cold-pressing techniques, at the temperature and pressure mentioned above, possess the disadvantage of having a relatively high porosity, e.g. up to 20%, and of being permeable so that the elements can be penetrated by undesirable substances, e.g. flux or flux constituents. This disadvantage of flux penetration can, however, be overcome by wetting and thoroughly impregnating the elements with aluminum at elevated temperatures, e.g. 1100 to 1150° C., in vacuum. The aluminum completely wets all the exposed surfaces of the elements and adheres thereto as a thin film. The aluminum will penetrate into any pores of the elements and impregnate them to a degree dependent upon the porosity thereof. The coating or impregnation, for example, of a TiC compact, with aluminum improves the electrical conductivity of the compact and it increases its resistance to oxidation at high temperatures. However, as the electrical conductivity of TiC is adequate in itself the improvement in this direction, though useful, is not of great importance. On the other hand, the increase in the oxidation resistance obtained in the case of TiC is an advantage. Such porous impregnated elements should not, however, be employed in positions where they are exposed to oxidizing atmospheres at temperatures above the melting point of aluminum as there appears to be a tendency for caustic attack of the elements possibly due to sodium, a product of the electrolysis, penetrating the elements via the aluminum-filled capillary passages and then oxidizing to caustic soda.

Permeable current-conducting elements formed from the cold-pressed material are desirably pre-wetted and impregnated with aluminum before being incorporated in an electrolytic cell as the wetting and impregnation of the elements cannot be satisfactorily achieved at the normal operating temperatures of the cell. A current-conducting element made by the cold-pressed method described above, i.e. by subjecting powdered titanium carbide first to pressure and subsequently sintering the compact at a high temperature was found to have a porosity of the order of 20% by volume, i.e. a density of 3.95 compared with the theoretical density of 4.93, and a free carbon content of less than 0.5%. It had an electrical resistivity of 54 microhm cm. and, when impregnated with aluminum, an electrical resistivity of 51 microhm cm. It had a transverse rupture modulus of 6–10 tons/sq. in. and a thermal shock resistance to a temperature differential of from 200° C. to 300° C. Thermal shock resistance was measured by plunging a test bar (e.g. ¾ in. diameter and 4 in. long) into molten aluminum at 750° C. The test was made quantitive by heating the bar to various temperatures before immersion and expressing the quality of the rod as the minimum temperature difference between it and the molten aluminum which would crack the bar.

The oxidation characteristics of the current-conducting element impregnated with aluminum expressed as weight increments in air at 1000° C. was as follows:

After 18 hours, 5.9 $10^{-3}$g./cm.$^2$
After 63 hours, 13.9 $10^{-3}$g./cm.$^2$ The titanium carbide content of the material employed was found to vary from 91% to 96% and the material had a titanium nitride content of up to 5%. Iron was found to be present in amounts up to about 1%, but no particular effects are ascribed to it.

Current-conducting elements made by the hot-pressed method described above, i.e. by subjecting the powdered material simultaneously to heat and pressure, were found to be less porous than those produced by the cold-pressed method. For example, elements hot-pressed at 2000° C. under a pressure of 1 ton per square inch were found to have a porosity of less than 10% and such elements are normally impermeable. Such elements had a density of 4.4 as compared with the theoretical density of 4.93. Such elements made from hot-pressed titanium carbide can be wetted with aluminum by vacuum treatment in the same way as the more porous material referred to above, but they cannot be impregnated with aluminum as the pores in the elements are not interconnected. However, in this case such is not essential as wetting takes place automatically in the cell. Also, with hot-pressed elements the free carbon content of the material is not as critical and a dense material containing as much as 1% free carbon has been found not to crack on wetting with molten aluminum. The reason for this is believed to be that with lower densities the free carbon is dispersed in the carbide as isolated particles of second phase and local reaction with molten aluminum occurs only on the surface of the element.

The electrical resistivity of the hot-pressed titanium carbide elements was found to vary with the composition of the material. Thus with elements prepared from mineral rutile the electrical resistivity varied substantially linearly from 84 microhm cm. at 90% by weight of titanium carbide to 63 microhm cm. at 96% by weight of titanium carbide. The values were, however, markedly lower when elements were prepared from pigment titanium oxide. This is ascribed partially to the lower zirconium and vanadium contents of the pigment oxide and also to a lower oxygen content of the material. However, a resistivity of 68 microhm cm. and a linear temperature coefficient up to 1000° C. of about 0.0008/° C. is considered to be reasonable and may be readily attained.

The hot-pressed titanium carbide elements were found to have a transverse rupture modulus of 15–20 tons/sq. in., a thermal conductivity of about 0.07 c.g.s. and a thermal expansion over the temperature range of 20° C.–400° C. of 7.2×10$^{-6}$ cm./cm./° C. and over the temperature range of 20° C.–1000° C. of 8.1×10$^{-6}$ cm./cm./° C. The elements were further found to have a thermal shock resistance to a temperature differential in excess of 300° C.

The hot-pressed titanium carbide elements were found to contain upwards of 90% by weight of titanium carbide, (usually not more than 96% by weight), up to 5% of titanium nitride and a free carbon content and iron content of up to 1% by weight each. The presence of the nitride, free carbon and iron had no apparent deleterious effect on the hot-pressed impermeable titanium carbide elements.

Although the carbides have a good resistance to aerial oxidation relative to carbon suitable protection should desirably be provided where these materials are used as current-conducting elements in electrolytic cells in positions in which they are exposed to such oxidation. They are advantageously provided with a sheath as will hereinafter be described. Titanium carbide is subject to a penetrating form of oxidation at a critical temperature of about 450° C. and this type of attack at this lower temperature is thought to be due to the formation of a disintegrated and non-protective metal oxide. The oxidation resistance of this material, however, increases at temperatures above 450° C. to a maximum value at about 700° C.–750° C. At still higher temperatures its oxidation resistance decreases progressively.

With regard to the effect of impurity content in the use of titanium carbide it has been found that oxygen tends to adversely affect the solubility of titanium carbide in molten aluminum in the temperature range normally found in operation of the cell, e.g. 950° C. to 1050° C. for a reduction cell. The oxygen present is in solution in the titanium carbide and probably is present in the form of titanium monoxide. It has been found that there is a strong tendency for the carbide to disintegrate where oxygen is present above 1% by weight. A reasonably good commercial product contains about 0.5% by weight of oxygen and this has been found to have a solubility in molten aluminum at 970° C. of about 0.02% titanium. Preferably the oxygen content in the carbide should be maintained in an amount less than 0.5%.

It will be appreciated from the foregoing that a current-conducting element of titanium carbide should have an oxygen content of less than about 1% by weight. Such an element when permeable, e.g. when made by the cold-pressing method and having a porosity of about 20% by volume, should have a free carbon content which is not greater than about 0.5% and it should desirably be pre-wetted and impregnated with aluminum prior to its incorporation in an electrolytic cell. An element which is substantially impermeable, i.e. having pores which are not interconnected, e.g. one made by the hot-pressing method and having a porosity not greater than about 10% by volume, does not have the limitation as to its free carbon content and need not be pre-wetted with aluminum. It may, however, advantageously be pre-wetted as such pre-wetting is a useful indication of the satisfactory nature of the material. If the element stands up to the wetting step without cracking, it is reasonably certain that the element will prove satisfactory in service and not disintegrate in the cell. Finally, the pre-wetting of the element with aluminum facilitates the making of the preferred form of connection between the element and the external current-supply bus-bars feeding the cell. This preferred form of connection is a bar of aluminum which is cast onto the element at its one end to be in intimate electrical contact with the carbide.

The product obtained by any of the methods set forth above is a shaped current-conducting element, e.g. a cathode, which can be effectively wetted with aluminum. When an element has been so wetted, a bar of pure aluminum to serve as an electrical conductor may readily be fused directly thereto. Consequently, when the cathode is in service, it may be connected to a source of electrolyzing current by a bus-bar directly fused or cast onto one end of the cathode which is not exposed to the interior of the cell, that portion of the cathode exposed to the interior of the cell being constituted by the refractory material coated with molten aluminum. It will be appreciated that electrical losses are low by reason of this construction.

When the cathode is employed at an appreciable inclination to the horizontal, the aluminum which is continuously deposited on the surface of the cathode while the cell is in operation runs down the latter to collect in a pool in the lower part of the cell, this pool preferably being in contact with the cathode. It should be noted, however, that the cathode remains completely wetted by molten aluminum which adheres tenaciously thereto.

A cell having an inclined cathode constructed in accordance with the invention may have anodes of carbon constructed and fed in any suitable manner and will operate on a voltage which is considerably less than that required in cells of comparable size employing cathodes of the orthodox type. Moreover, the current efficiency is higher than it has been possible to achieve in practice with cells of the usual construction.

With further reference to the refractory materials referred to above special reference should be made to titanium boride ($TiB_2$) and zirconium boride ($ZrB_2$) which have similar properties to each other, these properties being superior to those of the carbides for the purposes in view and not hitherto known. Titanium boride is readily wetted by molten aluminum under cell operating conditions and has a much lower electrical resistivity than titanium carbide (10-40 microhm cm. measured at 20° C.); has more resistance to oxidation than titanium carbide over the temperature range 300°-750° C. (this being very marked at temperatures of about 450° C.) and at temperatures above about 850° C. due to the normal formation of a glassy oxidation phase; and has a solubility in molten aluminum at temperatures of the order of 970° C. which is only about one-tenth of that of titanium carbide. It will thus be seen that the boride of titanium is preferred to the carbide for the purposes in view.

However, all the materials referred to have electrical resistivities which are sufficiently low to make them suitable for use in the production of current-conducting elements for employment in electrolytic cells for the production of aluminum.

The lower electrical resistivity of the borides (particularly titanium boride) is of practical importance as it enables an economy to be made in the cross-section of the current-conducting elements and/or in the number of such elements required and this helps to off-set the greater cost of these materials.

In addition to the characteristics mentioned above, the borides, and particularly titanium boride ($TiB_2$) and zirconium boride ($ZrB_2$), have other characteristics which render them particularly suitable for the purposes in view. The free carbon content of titanium boride has not been found to be in any way limiting. Titanium boride as normally manufactured does not have a high oxygen content but titanium boride is not sensitive to this oxygen content at least to the same degree as titanium carbide. Thus, impermeable current-conducting elements formed from hot-pressed titanium boride having an oxygen content of 1.4% have operated satisfactorily in reduction cell tests. The purity of the material employed does not appear to be critical. For example, tests have been made with titanium boride materials having quite high impurity contents, e.g. up to 1% by weight each of free carbon and nitrogen, excess boron, carbon and iron in combined forms. Current-conducting elements composed of these materials, hot-pressed, revealed no apparent deleterious effect as regards cracking or penetration and dissolved very slowly and uniformly in molten aluminum. The purity of the material does, however, have an effect upon its electrical resistivity and can vary it by a factor of about 4 at room temperature, i.e. from 10 to 40 microhms cm. so that it is desirable to control the purity from this point of view.

As mentioned above, the solubility characteristics of the borides is very much more favorable than the carbides. Thus in the reaction

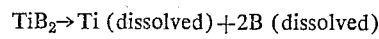
$$TiB_2 \rightarrow Ti\ (dissolved) + 2B\ (dissolved)$$

the stoichiometric solution of the compound at about 970° leads to titanium and boron contamination in the aluminum of about 0.004% and 0.0015% respectively, i.e. about one-tenth of the titanium content observed with the carbide. This advantage of the borides, particularly titanium boride and zirconium boride, was quite unexpected and could not have been predicted.

A further advantage of the borides is that, for example, in the equilibrium solution of $TiB_2$ in molten aluminum both titanium and boron are below their saturated solubilities and throughout a wide temperature range the simple solubility product law $(Ti) \times (B)^2 = $ constant; defines the conditions for the solution or precipitation of titanium boride. The dissolution of the elements can thus be hindered by the addition of titanium, or very much more effectively of boron, to the molten metal in the cell.

A certain amount of titanium is normally present in the metal from other sources and this prolongs the life of the current-conducting elements to some extent. The useful life of current-conducting elements composed of the borides is, however, quite long enough for the purposes in view so that normally it is not necessary to increase it by the addition of titanium or boron to the molten aluminum. However, if it is desired to increase the life of the elements composed of one or more of the borides, then boron may be added to the molten aluminum in the proportion of from 0.001% to 0.003% by weight or alternatively the metal of the boride, e.g. titanium, may be added in the proportion of from 0.001% to 0.005% by weight. It will be appreciated that, as a further alternative, a small proportion of both boron and the metal of the boride may be added to the molten aluminum.

As an example, tests have been carried out with current-conducting elements produced from hot-pressed titanium boride. The density of these elements was found to vary from 4.1 to 4.3 (theoretical density 4.52) and the porosity of the elements was always less than 10%. The elements had a thermal expansion over the temperature range of 20° C.–400° C. of $6.9 \times 10^{-6}$ cm./cm./° C. and over the range of 20° C.–1000° C. of $8.0 \times 10^{-6}$ cm./cm./° C. The electrical resistivity of these elements varied from 10 to 40 microhms cm. at 20° C. Elements having a resistivity of between 10 and 20 microhms cm. at room temperature were shown to have a linear resistivity-temperature relationship and a coefficient of 0.003/° C. The elements were shown to have a transverse rupture modulus of 15–20 tons/sq. in. The elements had a thermal shock resistance to a temperature differential of 350° C.

The elements had an oxidation resistance which was better than those produced from titanium carbide. This is most marked at 450° C. at which temperature the titanium boride elements showed a depth of penetration of 8 microns after 120 hours whereas the titanium carbide elements showed a depth of penetration of 88 microns.

I have determined the approximate value of the solubility product of titanium and boron in solution in molten aluminum at different temperatures and the following table sets out some examples of this product and the corresponding titanium concentration which is therefore observed when titanium boride ($TiB_2$) dissolves in the aluminum in its correct stoichiometric proportions.

| Temperature, C° | $(Ti) \times (B)^2$ | Ti for stoichiometric solution (percent) |
|---|---|---|
| 1100 | $6 \times 10^{-8}$ | 0.008 |
| 970 | $1 \times 10^{-8}$ | 0.004 |
| 850 | $2 \times 10^{-9}$ | 0.0026 |

Titanium boride materials may in practice contain a small excess of boron which dissolves preferentially in the molten aluminum and so reduces the solubility of the titanium in accordance with the above relationship. This effect, however, is usually transient.

As has been mentioned above, the purity of the boride material employed had no appreciable effect on the penetration of the elements. Mention should, however, be made of the fact that materials having 10% by weight of boron carbide deliberately added thereto were found to be subject to penetration effects.

Tests on current-conducting elements composed of hot-pressed zirconium boride showed this material to be comparable with titanium boride.

As a further feature of the invention it has been found that special advantages can be secured by the use of mixtures of titanium carbide and titanium boride, which would not be anticipated from a study of their properties determined separately.

The mixture may contain various proportions of the two ingredients, depending upon the properties required in the final product, and in some cases, the current-conducting element may be composed of a mixture the composition of which progressively changes along the length of the element.

The most surprising effect obtained by admixing titanium boride with titanium carbide, when preparing the current-conducting elements, is the decrease in the solubility of the titanium carbide in aluminum at high temperature (e.g. at 970° C.) as shown in FIGURE 1 of the drawings. Quite small percentage additions of the boride appreciably suppress the solubility of the carbide. As will be seen from FIGURE 1, the solubility of a titanium carbide sample decreased to approximately one-third by the addition of only 10% of titanium boride and that it then remained substantially constant up to at least 70% of the boride.

Since titanium boride is an expensive material compared with titanium carbide, it is of great value to be able to secure substantial improvements in solubility by the incorporation of relatively small portions of the boride in the cheaper and more readily available carbide. Generally, additions of the order of 5 to 25% by weight are adequate, the preferred amount being in the range from about 10 to 20% by weight. Additions of less than 10% will produce beneficial results, and it will then be a question of balancing the increased cost of the boride-containing material against the longer life of the current-conducting elements which would be obtained under cell conditions although it is preferred to add not less than 5%.

As far as other properties are concerned, the titanium carbide-titanium boride mixtures appear to be intermediate between the carbide and boride. Thus the resistance of the mixture to oxidation in air at high temperatures is better than that of titanium carbide alone. The electrical resistivity does not deviate very markedly from a linear relationship with composition and decreases from a value between 50 and 70 microhms cm. for titanium carbide to approximately 10 microhms cm. for titanium boride. There is thus an additional advantage to be gained from the use of the mixtures, which offsets the higher cost of the boride, in that an element of smaller cross-section can be used to carry a given current.

The carbide-boride mixtures may be prepared by several methods as hereinbefore discussed. It should be noted that it is now possible to produce a current-conducting element for use in either reduction or three-layer cells which is complex in composition. Thus it is possible, for example, to produce a bar element which contains 20% of titanium boride and 80% of titanium carbide over only a portion of its length, the remainder of it consisting essentially of titanium carbide only. Intermediately between the two links of different composition, the proportions of the ingredients may, if so desired, be changed progressively so that a "graded joint" is obtained. By this procedure, the risk of cracking at the juncture between the two links of different compositions is minimized. Also, it is feasible to produce current-conducting elements which consist of a mixture of carbide and boride where they protrude into the molten cathode pool of a cell, and of carbide only where they are buried in the wall or bottom of the cell itself.

It is further feasible to produce current-conducting elements which consist of the borides only where they protrude into the molten metal, the remainder of the element consisting of the carbide only. This is possible as the coefficient of expansion of the boride is very similar to that for the carbide.

In order that practical methods of utilizing current-conducting elements according to this invention may be more clearly understood, reference will now be made to the accompanying drawings which illustrate, somewhat diagrammatically, several examples of electrolytic reduction cells in which the cathodes are solid conducting elements disposed at an appreciable inclination to the horizontal or are pools of molten aluminum electrically connected to a source of electrolyzing current through one or more current-conducting elements according to this invention. Also, the drawings illustrate examples of the invention as embodied in three-layer purification cells.

Figure 2:
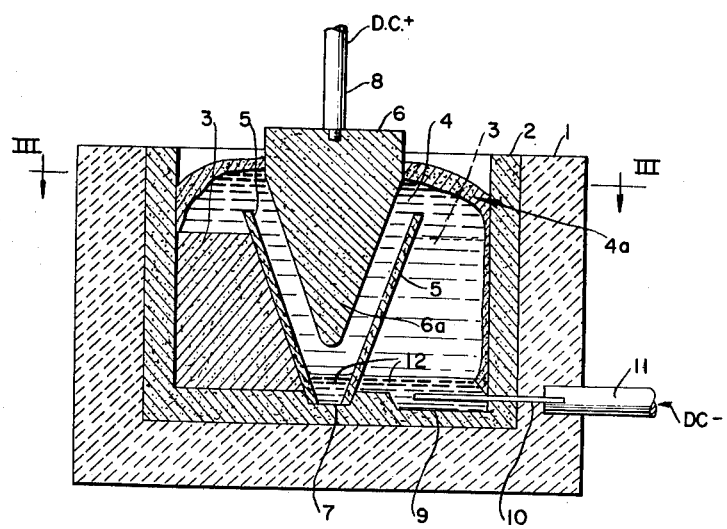
FIGURE 2 is a transverse vertical section of one construction of electrolytic reduction cell as it appears during operation thereof, this section being taken on the line II—II of FIGURE 3.
Figure 3:
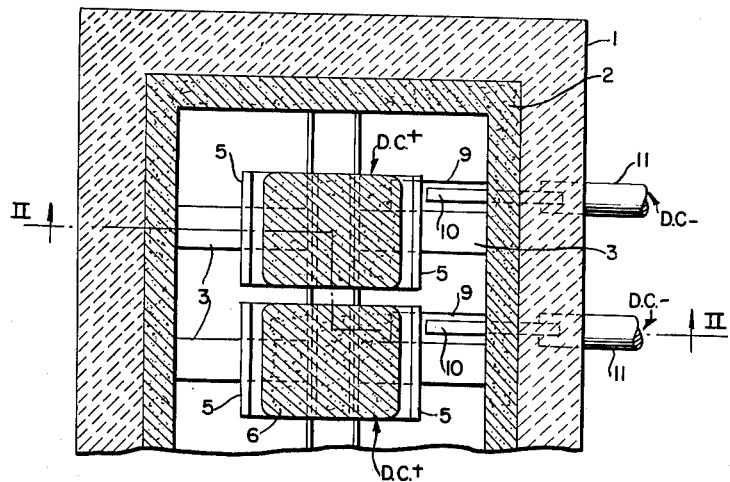
FIGURE 3 is a fragmentary section taken on the line III—III of FIGURE 2 showing one end of the cell, the flux or electrolyte and molten aluminum being omitted for purpose of clarity.

Referring first to the example illustrated in FIGS. 2 and 3, it will be seen that the cell is of rectangular shape both in plan view and in transverse section and comprises an outer wall 1 of a refractory insulating material, such as magnesite, and an inner wall or lining 2 of carbon. Vertical partition walls 3, also of carbon, are provided to extend inwards from the longitudinal side walls of the carbon lining, each partition wall being in contact at its outer and bottom faces with the respective surfaces of the carbon lining 2 but terminating short of the longitudinal center line of the cell. The inner face of each wall 3 is inclined upwards and outwards from its lower end at a relatively steep inclination to the horizontal and the upper face of the wall is located at a level somewhat below that of the upper surface of the molten electrolyte 4 which fills the cell when the latter is in operation. The partition walls 3 are spaced apart along the length of the cell and are arranged in opposed pairs, one wall of each pair serving to support the respective one of a pair of cathodes 5 adapted to cooperate with an anode 6 supported between them.

Each cathode 5 is composed of a rectangular plate of sintered carbide and/or boride, which is advantageously produced in the manner set forth in the foregoing description. This cathode plate rests by the central portion of its outer face against the inner face of the corresponding partition wall 3 and its lower edge is disposed in contact with the respective side wall of a channel 7 formed longitudinally of the inner face of the base of the carbon lining 2 and of a width to extend from one wall 3 of a pair to the other. It will be seen that in the arrangement described there are located at intervals along the length of the cell pairs of opposed cathode plates 5 arranged in a V formation with their lower edges spaced apart by the width of the channel 7. The upper edges of the cathode plates, as shown in FIG. 2, project somewhat above the upper faces of the partition walls 3 to terminate short of the upper surface of the molten electrolyte filling 4.

The anode 6 is constructed from carbon and is of rectangular shape in any horizontal section but has its lower or operative end portion formed of wedge shape so that its inclined rectangular faces 6a are disposed substantially parallel with the inner faces of the respective cathode plates 5. The anode 6 is supported by a hanger 8 (FIG. 2) of aluminum, iron or copper electrically connected to a bus-bar (not shown) to connect the anode to the positive pole of the source of supply of electrolyzing current. The upper portion of the anode extends above the level of the molten electrolyte filling 4 and through the crust 4a of solidified or frozen electrolyte overlying the same. As the anode is consumed during the operation of the cell it is progressively fed downwards in the well-known manner. The location of the inclined faces of the anode is such that the desired small inter-electrode distance will always be insured.

In the angle between one face of each partition wall 3 and the adjacent longitudinal face of the carbon lining 2 of the cell there is formed in the base of the lining a shallow depression 9 within which is disposed the inner end portion of a bar 10 formed from one or more of the carbides and borides set forth in the above description. The bar 10 is produced in the same manner as the cathode plates as set forth above. This bar constitutes a current lead and extends horizontally outwards through the vertical wall of the carbon lining 2 to be electrically connected to an aluminum bus-bar 11 which has its inner end embedded in the insulating wall 1. This bus-bar 11 may be connected to the current lead in the manner described in the foregoing in relation to the attachment of a current conductor to a carbide cathode, that is to say, the inner end of the bus-bar may be cast onto the current lead which has previously been wetted with molten aluminum. The bus-bars 11 are connected to the negative pole of the source of supply of the electrolyzing current.

With reference to the receptacle portion 1, 2 of the above described cell, it may be said that the receptacle generally defines a chamber having an upper zone adapted to contain a body of solidified flux, a lower zone adapted to receive a pool of molten aluminum and another electrode body in the form of a current-conducting element and an intermediate zone adapted to contain a body or charge of molten electrolyte or flux.

In preparing the cell for production, the electrolysis may be started by one of the several procedures known in the industry. For example, the anodes 6 may be lowered until the are in contact with cathode plates 5 and the base of the carbon box 2. By passing current through the electrodes and box the assembly may be heated to an appropriate temperature, say 700° C. The anodes may then be raised out of contact with cathode plates 5 and the box 2 while molten aluminum is poured into the cell to form a pool 12 covering the floor thereof, followed by molten electrolyte, e.g. molten cryolite containing dissolved alumina. When the cell is filled to the desired level the full electrolyzing current is supplied to the electrodes and the cell brought into full production.

When the cell is in full operation, the major proportion of the electrolyte is in the molten state, although there will form a crust 4a of solid or frozen electrolyte bridging the gap between the carbon lining 2 of the cell and the respective anodes 6 and also extending down the walls of the lining as indicated in FIG. 2. Aluminum is now being deposited on the whole of the exposed surfaces of the cathode plates 5, it being in the molten state, and runs down these surfaces into the pool 12 of molten metal extending over the base of the carbon lining 2, which pool also fills the channel 7. The pool constitutes the electrical connection between the current leads 10 and the cathode plates 5, substantially all the electrolyzing current being conducted by the aluminum and little or none by the carbon base. The molten aluminum may be tapped off from this pool from time to time as required.

In the arrangement shown in FIGS. 4–6 the construction of the cell is substantially the same as that shown in FIGS. 2 and 3 so far as the insulating outer wall 1, carbon lining 2, partition walls 3, cathode plates 5, anodes 6 and channel 7 are concerned.

In this case, however, the current leads 10 shown in FIGS. 2 and 3 are omitted and the connections between the cathode plates 5 and the negative pole of the current supply source comprise extensions 5a formed integrally on the upper edges of the cathode plates to project upwards through the solidified crust 4a of electrolyte. Each of these extensions 5a is connected to an aluminum bus-bar 11, for example, by having the adjacent end of this bar cast thereon or brazed thereto. In this case the shallow depressions 9 provided in the construction according to FIGS. 2 and 3 are not required. Desirably, although not absolutely necessary, in order to enhance the resistance of the extensions 5a against oxidation and corrosion where they pass through and emerge from the crust 4a they are surrounded over the relevant part of their length by a sleeve 5b consisting of a suitable refractory material, for example, that known as "Refrax" which is silicon carbide bonded with silicon nitride. Alternatively, the material may be hot pressed silicon carbide.

The method of operation of this cell is substantially the same as that shown in FIGS. 2 and 3 but, in this case, the supply of current to the plates 5 is effected through the extensions 5a.

FIGS. 4 to 6 additionally illustrate a hood 13 seating by its lower edge on the upper edge on the insulating wall 1 and having its interior connected by a duct 14 to a fume extraction plant (not shown). Suitable apertures are provided in the hood to permit the passage of the bus-bars which serve to conduct current to the cathode plates and anodes, respectively. It will be appreciated that a similar hood may be provided in the arrangement shown in FIGS. 2 and 3.

In both cells illustrated, aluminum is deposited electrolytically upon the inclined faces of the cathode plates 5 and runs down these faces to collect in a pool 12 on the bottom of the cell. If the plates 5 were not wetted with aluminum before being built into the cell, the first quantity of aluminum deposited thereon serves to effect adequate wetting of their faces but once this has occurred, the aluminum subsequently deposited trickles to the pool as mentioned above. In some cases it may be preferred to employ cathode plates which have been wetted with molten aluminum, by the method set forth above, before they are introduced into the cell. The aluminum produced by electrolysis will then run down the cathode plates from the start.

It should be noted that the cell may be operated in such a manner that there is a thicker crust 4a of solidified electrolyte surrounding the inner molten portion of the electrolyte than is shown in the drawings, in which case the whole body of electrolyte may be contained in a simple box of steel or other suitable material.

It will be appreciated that the cathodes 5 of the arrangements illustrated in FIGS. 2 to 6 would be relatively large and they would be expensive to manufacture. This expense may be reduced by making the cathodes 5 of carbon coated with one or more of the carbides and borides referred to, preferably titanium boride.

FIGURES 7 to 10 illustrate modifications of orthodox electrolytic reduction cells according to this invention.

With reference to FIG. 7, the cell shown has a base or plinth 21 of a refractory insulating material, such as magnesite, upon which is supported a shallow box structure 22 composed of carbon. This structure is supported and contained by a surrounding wall 23 of steel.

Along the longitudinal edges of the upper surface of the bottom of the box 22 there are formed two shallow channels 24 into which project, at intervals along the length of the cell, current-conducting elements 25 of bar form composed of at least one of the carbides and borides mentioned above. In this arrangement, each bar 25 extends horizontally through the wall of the box 22 to project into the adjacent longitudinal channel 24, its outer end being attached to a bus-bar 26 of pure aluminum which is connected to the negative pole of the source of supply of the electrolyzing current. The end of the bus-bar 26 may be cast around the adjacent end of the bar 25.

The anode 27 is of carbon and is connected by suitable means (not shown) to the positive pole of the source of supply of electrolyzing current. The bus-bars 26 are connected, as at 26a on the left-hand side of FIG. 7, to main bus-bars 28 which extend along the sides of the cell.

The cell may be brought into operation by one of the several procedures known in the industry. For example, the anode 27 and the box 22 may be heated to the operating temperature by lowering the anode onto suitable carbon blocks placed on the base of the box and passing electric current through them. After the blocks have been removed, electrolysis can be started by pouring in molten aluminum to form a pool 29 covering the bars 25, adding molten electrolyte 30 containing dissolved alumina and immediately passing the full electrolyzing current through the cell. The pool of molten metal effectively constitutes the cathode for the cell. When the latter is in full operation, the major part of the electrolyte is maintained in the molten state, as shown at 30, and is covered by a crust 31 of solid or frozen electrolyte.

With reference to the receptacle (portions 21, 22, 23) of cells of the above described type, it may be said that the receptacle generally defines a chamber having a lower zone (horizontal) adapted to receive a body of molten aluminum, an intermediate zone (horizontal) adapted to receive a body or charge of molten electrolyte or flux, and an upper zone (horizontal) adapted to contain therein a layer of solidified electrolyte or flux. As is apparent, the anode is disposed within the zone of electrolyte, both solidified and molten. Alternatively, it may be said that the receptacle defines an upper zone (horizontal) adapted to receive a first electrode body, a lower zone (horizontal) adapted to receive a second electrode body, and an intermediate zone adapted to contain a body or charge of molten electrolyte or flux.

FIG. 8 illustrates another arrangement of the current-conducting elements 25 where each of them (only one is shown in the figure) is introduced into the cell from above, passing through the crust 31 of solidified electrolyte which extends over the body 30 of molten electrolyte and bridges the gap between the anode 27 and the margins of the cell. The element 25 may be provided with a sheath 32 similar to the sheath 5b described with reference to FIGS. 4, 5 and 6. The current-conducting element 25 extends down the inner face of the appropriate side wall of the cell to terminate at its lower end in close proximity to the base of the cell. When the latter is in operation a pool 29 of molten aluminum collects on the base and submerges the lower end of the element 25.

In the alternative arrangement shown in FIG. 9, the current-conducting elements 25 are disposed vertically and inserted through the base of the carbon box 22 of the cell. The upper ends of the elements 25 project for a short distance above the inner surface of the carbon base of the cell into the lower zone of the chamber defined by box 22 and effectively establish electrical connection between the pool 29 of molten metal which collects in the lower zone on this base and the negative bus-bars 26b which are shown as electrically connected to a main bus-bar 28a extending beneath the cell.

FIGS. 10 and 11 illustrate a further modification of an orthodox reduction cell by incorporating therein current-conducting elements according to this invention. As is usual, the base of the box 22 is composed of blocks of graphitic material in which there are embedded iron bars 33 serving to connect the blocks electrically to negative bus-bars (not shown) located externally of the cell. Such cells suffer from the disadvantage that a high resistance electrical contact is normally present between the molten aluminum 29 and the box 22, due to the fact that the metal does not wet carbon and a poorly conducting sludge settles on the latter during the operation of the cell.

In order to overcome this disadvantage, current-conducting elements 25a, in the form of rods of cylindrical or other shape composed of one or more of the carbides and borides referred to above, are inserted in bores formed in the blocks of the cell bottom, these rod elements being of a length somewhat greater than the depth of the bores so that their upper ends project into the molten metal 29 and provide low-resistance paths for the electrolyzing current which short-circuit the sludge layer. The bores are preferably formed so that they are uniformly distributed over the bottom of the cell at locations substantially registering with those of the iron bars 33 but terminate short of these so that there will be an intervening solid portion of the carbon of the block which will obviate leakage of the cell contents. The elements 25a are preferably bonded in position by means of a thin layer of pitch which is converted into a solid carbonaceous binder at the temperature of operation of the cell. Instead of the "pre-baked" anodes indicated in FIGS. 10 and 11 a "self-baking" anode may, of course, be used and in this case it is continuously renewed from above in the well-known manner by supplying a carbonaceous material to its upper end. The same applies for the anodes of FIGS. 7 to 9.

A test was carried out on an orthodox reduction cell modified in the manner illustrated in FIGS. 10 and 11 and a careful comparison made with an entirely orthodox or control cell run in series with it and operated under identical conditions. The modified cell had inserted vertically into the carbon floor an appropriate number (24) of hot pressed titanium carbide bars 2 inches in diameter and 7 inches long, uniformly distributed over the floor and arranged so that 1¼ inches of the bars projected above the carbon cathode. The control cell was entirely similar except for the provision of these carbide bars.

The two cells were observed carefully over a period of approximately 3 months, the average current through them during this time being 16,000 amperes. The electrolyte used was conventional sodium cryolite containing excess aluminum fluoride ($AlF_3$) and a small amount of calcium fluoride ($CaF_2$), the latter being controlled in the range 6–10% throughout the experiment. With regard to the aluminum fluoride content the flux composition was controlled so that the excess of that required to form cryolite ($3NaF.AlF_3$) over the 3 month period averaged 6.8% for the carbide modified cell and 6.5% for the control or orthodox cell. The cells were operated in the well-known manner in which aluminum oxide ($Al_2O_3$) is fed into the electrolyte at regular intervals; the percentage of aluminum in the electrolyte was thus about 5% when this addition had been freshly made and fell slowly to 0.5–1.0% when an "anode effect" occurred, i.e. the voltage across the cell increased to a relatively high value, and a further addition was required.

Regular measurements were made of the temperature of the flux and also of the aluminum metal pool at the bottom of the cell; the average values over the 3 month period were as follows below:

|  | TiC Modified Cell | Control Cell |
| --- | --- | --- |
| Flux Temperature, ° C | 960 | 964 |
| Metal Temperature, ° C | 943 | 953 |

The average cathode voltage drop in the control cell over the test period was 0.58 volt, the individual readings varying between 0.45 and 0.81 volt. The corresponding average cathode voltage drop on the carbide modified cell was 0.38 volt and the individual values varied between 0.30 and 0.46 volt. The control or orthodox cell had a current efficiency over the test period of 89.8%, whereas the modified cell had a current efficiency of 90.8% over the same period. The metal produced by the modified cell had a titanium content approximately 0.02% higher than that for the control cell.

A modified cell constructed in accordance with the embodiments shown in FIGS. 10 and 11, in which the elements 25a consisted of hot-pressed titanium boride bars 2 inches in diameter and 9 to 9½ inches in length, was also compared with an unmodified orthodox or control cell run in series with it. These cells were of a larger type than those given in the example above, and the series current was about 40,000 amperes. The number of titanium boride elements inserted in the floor of the test cell was 27, i.e. due to the lower electrical resistivity of the boride as compared with the carbide each boride bar carries twice as much current as a corresponding carbide bar for the same voltage drop.

The cells were operated for a test period of five months under similar conditions to those already described with reference to the cell modified by the titanium carbide leads with the sodium cryolite electrolyte containing approximately 8% calcium fluoride ($CaF_2$), and with an excess aluminum fluoride content of about 3–5%. The average cathode voltage drop of the modified cell over the test period was 0.2 volt less than that of the control cell and the current efficiency was also about 2.0% higher. The average titanium and boron contents in the metal produced by the two cells was as follows: Titanium boride modified cell 0.007% titanium, 0.001% boron. Control cell 0.0045% titanium, 0.0002% boron.

Current-conducting elements 25a consisting essentially of hot-pressed titanium boride have been tested continuously over a period of five months in a reduction cell such as is illustrated in FIGS. 10 and 11. The elements 25a were in the form of cylindrical bars having a diameter of 2 inches and a length of 4 inches and had a porosity of about 6% by volume. The material when analyzed was found to have the following composition, the percentages being by weight:

| | Percent |
| --- | --- |
| Soluble boron | 29.53 |
| Free carbon | 0.34 |
| Combined carbon | 0.43 |
| Nitrogen | 0.68 |
| Oxygen | 1.37 |
| Iron | 0.88 |
| Insoluble boron | 1.92 |

From this analysis it is estimated that the proportion of titanium boride ($TiB_2$) present was about 95%. The initial solubility of the elements was found to be .002% Ti and 0.002% boron.

These elements when removed at the end of the five months test period were found to be in a sound condition and the end thereof exposed to the molten aluminum had been uniformly reduced in diameter by about 0.4 inch.

FIGS. 12 and 13 illustrate a still further arrangement of the current-conducting elements wherein each of the elements 34 is introduced into the cell from above passing through the crust 31 of solidified electrolyte which extends over the body 30 of molten electrolyte through the body 30 of molten electrolyte and into the pool 29 of molten aluminum. The container or box 22a is composed of any suitable refractory material which is resistant to attack by molten aluminum, electrolyte and oxidizing atmospheres. It is not essential for this material to be electrically conducting and it may thus, for example, be composed of the material known as "Refrax," i.e. silicon carbide bonded with silicon nitride, or hot-pressed silicon carbide. Two parallel spaced rows of carbon anodes 27 extend substantially vertically through the crust 31 into the body 30 of molten electrolyte. The elements 34 are disposed in a row between and parallel to the anodes 27 with their lower ends in close proximity to, but spaced from, the floor of the container 22a. The elements 34 are conveniently in the form of cylindrical bars and there may be, for example, three elements disposed between each opposed pair of anodes 27. A sleeve 35 may be provided on that part of each element exposed, this sleeve being a suitable refractory material, e.g. the material known as "Refrax" or hot-pressed silicon carbide. The anodes 27 are suspended by hangers 36 through which they are connected to parallel bus-bars 37 and 38 (FIG. 13) adapted to be connected to the positive pole of a source of electrolyzing current. The bus-bar 37 is common to one row of anodes 27 and the bus-bar 38 is common to the other row of anodes 27. The elements 34 are suspended by hangers 39 which are conveniently of aluminum cast around the upper ends of the elements 34 and the hangers are connected to a common bus-bar 40 which is parallel to the bus-bars 37 and 38 and is adapted to be connected to the negative pole of the current source.

The bus-bars 37, 38 and 40 are connected to the respective poles of the current source in such manner that the current flow along the bus-bars 37 and 38 is in one direction and the current flow along the bus-bar 40 is in the opposite direction. This can be achieved by connecting, for example, the right-hand ends of the bus-bars 37, 38 and 40 as seen in FIG. 13 to the respective poles of the source of electrolyzing current. The advantage of this is that it reduces to a minimum the effects of the magnetic fields produced by the currents due to the fact that the field produced by the current in the bus-bar 40 tends to neutralize the fields produced by the currents in the bus-bars 37 and 38. This is of importance as, without this arrangement, the magnetic fields would have an undesirable agitating and stirring effect upon the contents of the cell. By adjusting the relative heights of the bus-bars 37, 38 and 40 wtih respect to the cell the magnetic fields may be arranged substantially to neutralize each other, at least so far as the cell contents are concerned.

An advantage of the arrangement described with reference to FIGS. 12 and 13 is that the elements 34 are not built into the cell and may be readily replaced as required.

Reduction cells are usually operated with a cryolite-calcium fluoride electrolyte and at a temperature of 950° to 970° C. It has been proposed to operate reduction cells employing conventional anodes and cathodes of carbon and graphite with an electrolyte bath containing sodium chloride as a constituent. The advantages occurring from the use of a sodium chloride type of electrolyte stem from the fact that the cell operates at a lower temperature than those employing the conventional electrolyte, e.g. at 920° C. On the other hand, the solubility of alumina in the sodium chloride type of electrolyte is lower, but this is partially off-set by a lowering of the alumina content at which the "anode effect" occurs, i.e. at about 0.4% by weight of alumina compared with 1.5 to 2% in the normal bath. The lower solubility of the alumina leads to difficulties in conventional reduction cells, however, because it is difficult to avoid overfeeding the alumina to the cell and the excess settles on the floor of the cell in the form of a sludge. As, in conventional reduction cells, the electrical connection to the molten pool of aluminum is through the floor of the cell this impairs the efficient operation of the cell.

This disadvantage of the "overfeeding" due to the reduced solubility of the alumina in the NaCl-type electrolyte can easily be overcome by practice of the instant invention wherein the current-conducting elements may be arranged to project into the molten metal above the level of the sludge. They may extend through a side wall of the cell, through the cathode bottom thereof, or downwardly through the electrolyte thereby maintaining good electrical connection with the metal at all times.

Accordingly, it will thus be seen that the cell structure of the invention permits the use of sodium chloride containing electrolytes and because the dissolution of the current-conducting element in the aluminum produced in the cell is a function of the temperature, the use of sodium chloride type of electrolyte makes it possible to prolong the life of the element by reason of the lower temperature at which the cell can then be operated. The reduction of the operating temperature by about 40° C., which it is possible to achieve, has a material effect upon the life of the element.

As an example only, the fused salt bath employed may contain sodium cryolite and sodium chloride, the latter constituting between about 10 and 30% by weight of the bath.

Reduction cells such as are illustrated in FIGS. 2 to 13 may advantageously utilize a bath containing sodium chloride as a constituent.

FIGS. 14 and 15 show the application of the invention to three-layer purification cells. In both figures a current-conducting element 45, which is advantageously composed of one or more of the carbides and borides referred to, extends horizontally through the insulating (magnesite) wall 46 of the cell to project by its inner end into a depression 47 formed in the base of the cell so that, when the cell is in operation, it will be submerged in the body 48 of molten aluminum alloy which constitutes the bottom layer. The outer end of the element 45 is connected to an aluminum bus-bar 49 (which may be cast thereon) leading to the positive pole of the source of supply of the electrolyzing current.

In FIG. 14 current-conducting elements 50 composed of one or more of the carbides and borides referred to constitute vertically disposed bars immersed by their lower ends in the layer 51 of purified aluminum floating on the body 52 of molten electrolyte, and attached at their upper ends to a negative bus-bar 53. These elements may be connected to the bus-bar by being brazed thereto (as at 54) or by having the bar 53 cast about their upper ends. As in FIGS. 4 and 8, the exposed portions of the elements 50 may be further protected against oxidation and other harmful effects by a sleeve 55 or, alternatively, the sleeve may be cast therearound as will be described hereinafter.

FIG. 15 shows a modified arrangement of current-conducting elements wherein the element supplying the top layer 51, and designated as 56, is arranged in substantially the same manner as the lead 45 for supplying the bottom layer 48, that is to say, it extends horizontally through the side wall of the cell and is connected at its outer end to an aluminum bus-bar 57 which is, in this case, connected to the negative pole of the current-supply source.

With regard to three-layer purification or refining cells of the type mentioned above (and described with reference to FIGURE 19) it may be said that the insulating wall 46 defines a chamber having an upper zone (horizontal) adapted to receive a body of molten purified aluminum (cathode), a lower zone (horizontal) adapted to receive a body of molten aluminum alloy (anode), and an intermediate zone adapted to hold a charge or body of molten flux or electrolyte.

As has been mentioned above it is desirable to protect the current-conducting elements against oxidation and corrosion where they are exposed for part of their length to oxidizing or corrosive atmospheres as, for example, the current-conducting elements 50 illustrated in FIG. 14. This is particularly so when the elements, cathodes, or extensions thereof are formed from the carbides, as distinguished from the borides such as titanium boride, the carbides being subject to a particularly penetrating form of oxidation at temperatures of about 450° C. at which a powdery non-protective oxidation product is formed. A satisfactory method of protecting an element is to cover the exposed portion thereof with a sheath of aluminum. However, the mere application of an aluminum cover fitted mechanically over the lead, or even cast around it does not afford adequate protection.

Although the carbides and borides referred to can be wetted with aluminum in a vacuum at a temperature about 1150° C., or electrolytically by making the material the cathode in a reduction or refining cell, these methods are not convenient to use, particularly in the case of titanium carbide, where it is a question of presheathing the element. It is preferred, therefore, to coat the element with cobalt or nickel by suitable means, to sinter the coating on to the surface of the material, and then to cast on aluminum under conditions such that it will alloy with the cobalt or nickel layer. This produces a firmly adherent outer sheath of aluminum which is metallically bonded to the surface of the element and which affords very good protection from oxidation.

As an example, the separate steps in the process may be carried out as follows:

(a) A hot-pressed TiC bar 2" in diameter (to be used as a current-conducting element) is thoroughly cleaned to remove the graphitic surface layer. This is most readily carried out by sand-blasting, but chemical cleaning (for example, in a hot alkaline potassium permanganate solution) may also be used successfully. The bar must not be handled after cleaning.

(b) The bar is washed with water and immediately plated with cobalt or nickel to a thickness of about 0.001 in. An ammoniacal cobalt sulphate bath is suitable for the cobalt plating and a nickel sulphate ammonium chloride bath for the nickel plating.

(c) The plated bar is heated in a neutral or reducing atmosphere to approximately 1050° C. and maintained at that temperature for about 30 minutes to fire the cobalt or nickel onto the carbide. This treatment is conveniently carried out in an electric furnace provided with a hydrogen atmosphere, but good results have also been obtained by inserting the bar into a closed graphite container which is then heated to the required temperature without any other precautions with regard to control of the atmosphere.

(d) The bar is finally set in the bottom of an appropriate graphite mould contained in a steel shell and heated to 750–800° C. Molten aluminum at the same temperature is then poured in and after a brief period at this temperature (say, 15 minutes) the mould is removed from the furnace and left to cool. The mould incorporates a large feeding head at the top and the cooling of this is delayed by local heating so that directional solidification of the metal towards the head is encouraged.

As a result a sound sheath ¼" thick open at one end and closed at the other is produced around the bar over practically the whole length thereof (one end being left bare) and continues at its closed end as a solid rod (2½" in diameter) for approximately 10 ins. beyond the end of the TiC bar.

A complete sheathed electrode composed of titanium carbide and ready for insertion into a three-layer cell is shown in FIGS. 16 to 18. The TiC bar 59 is 2 ins. in diameter and is normally about 9½ ins. long; it may, however, be very much shorter than this if desired, and bars only 4 ins. long have been operated successfully.

The aluminum sheath 60 is conveniently of the thickness mentioned above, i.e. ¼ inch, but this may be varied widely without affecting the efficient functioning of the electrode. The purity of aluminum used is not very important since only a small amount of it is finally dissolved in the cathode metal of the cell. Commercial purity (99.2%) aluminum is quite suitable for the purpose.

During the operation of casting-on the sheath the bottom end 61 of the TiC bar is inserted into a graphite jig in order to centralize the bar in the mold. This portion of the bar (approximately ½ inch long) is thus not covered with aluminum. The electrode is normally immersed in the metal layer in the cell, however, to a depth of about 2 inches, the level of the surface of this layer being indicated at 62 in FIG. 16, and it is important to ensure that the aluminum sheath is properly bonded to the TiC to below this level in the casting-on operation. When in use in a cell, the sheath 60 on the bar 59 melts back to a point about ½ inch above the level 62, and the skin of metal left behind by the adherent sheath serves to protect the exposed interface from oxidation and attack by flux vapours.

Electrical connection from the external circuit is made to the end of the solid portion 63 of the sheath extending beyond the bar 59. This may be conveniently done by flattening the end 64 of the solid portion 63 and welding it directly to a suitable aluminum lead, e.g. a rectangular bar with a cross-section of 4 x ¾ inches as shown at 65.

With regard to the above manner of sheathing the end of current-conducting element 59, it is to be understood that such procedure can be used as an alternative to that hereinbefore set forth for affixing the cathodic current-conducting elements of reduction cells to the bus-bars, e.g. affixing the element 10 to bus-bar 11 of FIG. 2 or affixing the elements 25 to bus-bars 26 of FIGS. 7 to 9.

In order to reduce losses of energy from the cell by radiation and convection, it is advantageous to use a screen over the layer 62 of cathode metal. This may be arranged to depend from the electrodes themselves and a type of screen that may be used is shown in FIG. 16. It consists of an aluminum plate 66 approximately ¼" thick, which fits over the sheath 60 and is supported by a collar 67; this can be adjusted to any given position and locked by means of the screws 68 which penetrate into the aluminum sheath.

One way in which electrodes of the type described above may be utilized in a three-layer cell is illustrated in FIG. 19.

The main structure of the cell consists of a base and outer container 70, constructed from refractory bricks of a material, such as magnesite, which is resistant to the molten electrolytes used in the electrolysis. Iron conductor bars 71 are inserted through the side wall and are supported by the base of the cell; they are left projecting on the exterior of the cell so that convenient connection may be made to the positive pole of the external electrical circuit. The internal floor of the cell is constructed of carbon or graphite blocks 72, which are fitted over the conductor bars and are in good electrical contact with them.

The molten bath itself consists of an anode layer 73 of aluminum containing a high proportion of copper to increase its density, an electrolyte layer 74, and a cathode layer 62 of purified aluminum. The temperature of the bath under normal running conditions is usually in the range 740°–780° C.

Electrical connection is made to the cathode layer 62 by means of the sheathed electrodes described above. The TiC bars 59 are immersed in the molten aluminum to a depth of about 2 inches. The aluminum conductor 65, which forms the main suspension of each electrode, is clamped to the main external electrical bus-bar or "cathode beam" 75. These beams are normally arranged so that they can be adjusted in height; thus when the level of the molten bath changes (for example, when the pure metal in the top layer is tapped off) all the electrodes can be raised or lowered simultaneously to correct their immersion. Individual adjustment of each electrode can be made by means of the clamp 76 used to hold the electrode in good electrical contact with the beam.

Tests made on a cell constructed in the manner illustrated in FIG. 19 embodying current-conducting elements 59 of titanium carbide illustrate the advantages of such a cell as compared to a corresponding orthodox cell. The orthodox cell embodied nine 15 inch diameter graphite electrodes each carrying a current of 3,000 amperes and wherein the voltage drop from the conductor 65 to the purified aluminum layer 62 was 0.4 to 0.6 volt. The modified cell embodied eighteen 2 inch diameter electrodes each carrying a current of 1500 amperes and wherein the voltage drop from the conductor 65 to the purified aluminum layer 62 was 0.02 to 0.08 volt. The carbide elements required for the full equipment of a cell were very much less bulky than the corresponding graphite electrodes due to their lower resistivity and this allows the electrodes to be arranged to considerable advantage with respect to shielding of the upper surface of the bath to minimize heat losses, and this aspect is of great importance in overall efficiency of operation.

In order to minimize the loss of energy from the cell by radiation and convection, it is beneficial to cover in the top with appropriate screens. This can be done by a suitable combination of screens 66 carried by the individual electrodes, and other screens 77 which rest on the side walls of the cell.

It should be noted that the TiC bars are liable to crack if subjected to severe thermal shock, and it is advisable to introduce them into the cell slowly, so that they are pre-heated before entering the molten aluminum layer. Alternatively, a thermal barrier is provided by coating the bars with tar and then dusting them with carbon black. This delays the heating of the bars so that they may be inserted directly in the layer of molten aluminum without any risk of cracking.

Although the above description refers to current-conducting elements composed of titanium carbide, it will be appreciated that elements composed of the other carbides and the borides referred to above may be sheathed with aluminum in a similar manner.

With further regard to the three-layer cells shown in FIGURES 14, 15, and 19, and described above, it is also contemplated within the scope of the invention that electrical connection with the bottom layer of molten metal, i.e. the molten aluminum alloy layer, can be by provision of one or more current-conducting elements projecting upwardly from the bottom of the cell as shown in the reduction cell structure of FIGURE 9, rather than by means of elements extending horizontally through the insulating wall or use of carbon or graphite blocks as the cell floor.

It will be seen that the modification of electrolytic cells for the production of aluminum proposed in the present invention represents a very considerable improvement on the existing types of cell. This improvement is brought about by the use of special materials in a new context, i.e. the use of the carbides and borides of titanium, zirconium, titanium and niobium and mixtures thereof as cathodes and leads to operate in contact with both molten aluminum-containing and molten electrolyte in such electrolytic cells. From the data given above, it will be seen that although these advantages were first achieved by the use of the carbides of these elements, the borides were subsequently found to be markedly superior in many respects and can be used more beneficially in most of the structures cited.

Thus electrolytic cells incorporating current-conducting elements, e.g. cathodes, leads, etc., having an operative face consisting essentially of at least one of the refractory materials referred to hereinbefore have the following advantages:

(a) There is only a small voltage drop at the cathode of the cells compared with conventional cells.

(b) There can be a virtual elimination of the iron bars embedded in or in contact with the carbon floors of conventional cells. The iron bars are expensive, they have different thermal expansion and growth characteristics from the carbon under cathodic conditions, and thus contribute to the weakening of the floor structure which usually occurs. At a certain stage in the life of the cell metal is able to penetrate to the iron bar and this leads to a high degree of contamination of the aluminum produced.

(c) The floor of the cell does not have to carry any electric current so that it can now be made primarily to have a long life, this being not necessarily compatible with electrical conductivity. Further the electrochemical consequences of the potential gradient in the floor of a reduction cell are avoided, namely, the enhancing of the tendency for constituents from the electrolyte or flux to penetrate into the carbon cathode. The consequence of this penetration are growth and disruption of the base of the cell.

(d) Greater freedom in the geometrical design of the cathode and of the cell container than is possible when carbon is employed as the cathodic material, and (e) The operative face of the cathodic current-conducting element may be inclined at a substantial angle to the horizontal and spaced a minimum interpolar distance from the operative face of the anode thus eliminating the generation of unnecessary heat and improving the efficiency of the cell.

The boride and carbide materials mentioned above have been referred to by certain text writers as refractory hard metals. See Schwarzkopf et al. "Refractory Hard Metals" published by The MacMillan Company, 1953.

It will be obvious that various modifications and alterations may be made in this invention without departing from the spirit and scope thereof and it is not to be taken as limited except by the dependent claims herein.

What is claimed is:

1. A current-conducting element consisting essentially of at least one of the carbides of titanium, zirconium, tantalum and niobium, said element carrying a tenaciously adhering coating of aluminum.

2. A current-conducting element consisting essentially of at least one of the borides of titanium, zirconium, tantalum and niobium, said element carrying a tenaciously adhering coating of aluminum.

3. A current-conducting element consisting essentially of a mixture of at least one of the carbides and at least one of the borides of titanium, zirconium, tantalum and niobium, said element carrying a tenaciously adhering coating of aluminum.

4. A current-conducting element comprising a bar which consists essentially of at least one of the carbides of titanium, zirconium, tantalum and niobium and a sheath of aluminum metallically bonded to the surface of the bar.

5. A current-conducting element comprising a bar which consists essentially of at least one of the borides of titanium, zirconium, tantalum and niobium and a sheath of aluminum metallically bonded to the surface of the bar.

6. A current-conducting element comprising a bar which consists essentially of a mixture of at least one of the carbides and at least one of the borides of titanium, zirconium, tantalum and niobium and a sheath of aluminum metallically bonded to the surface of the bar.

7. A current-conducting element comprising a sheath of aluminum which is open at one end and closed at the other end, the sheath continuing at its closed end as a solid rod and a bar which consists essentially of at least one of the carbides of titanium, zirconium, tantalum and niobium, said bar being disposed within said sheath and projecting beyond the open end thereof and said sheath being metallically bonded to the surface of said bar.

8. A current-conducting element comprising a sheath of aluminum which is open at one end and closed at the other end, the sheath continuing at its closed end as a solid rod and a bar which consists essentially of at least one of the borides of titanium, zirconium, tantalum and niobium, said bar being disposed within said sheath and projecting beyond the open end thereof and said sheath being metallically bonded to the surface of said bar.

9. A current-conducting element comprising a sheath of aluminum which is open at one end and closed at the other end, the sheath continuing at its closed end as a solid rod and a bar which consists essentially of a mixture of at least one of the carbides and at least one of the borides of titanium, zirconium, tantalum and niobium, said bar being disposed within said sheath and projecting beyond the open end thereof and said sheath being metallically bonded to the surface of said bar.

10. A current-conducting element comprising a bar which consists essentially of at least one of the carbides of titanium, zirconium, tantalum and niobium, a sheath of aluminum metallically bonded to the surface of said bar and a screen supported by said sheath intermediate the length thereof.

11. A current-conducting element comprising a sheath of aluminum which is open at one end and closed at the other end, the sheath continuing at its closed end as a solid rod, a screen supported by said sheath intermediate the length thereof and extending substantially normal to the direction of length thereof, and a bar which consists essentially of at least one of the carbides of titanium, zirconium, tantalum and niobium, said bar being disposed within said sheath and projecting beyond the open end thereof and said sheath being metallically bonded to the surface of said bar.

12. A current-conducting element comprising a sheath of aluminum which is open at one end and closed at the other end, the sheath continuing at its closed end as a solid rod, a screen supported by said sheath intermediate the length thereof and extending substantially normal to the direction of length thereof, and a bar which consists essentially of at least one of the borides of titanium, zirconium, tantalum and niobium, said bar being disposed within said sheath and projecting beyond the open end thereof and said sheath being metallically bonded to the surface of said bar.

13. A current-conducting element comprising a sheath of aluminum which is open at one end and closed at the other end, the sheath continuing at its closed end as a solid rod, a screen supported by said sheath intermediate the length thereof and extending substantially normal to the direction of length thereof, and a bar which consists essentially of a mixture of at least one of the carbides and at least one of the borides of titanium, zirconium, tantalum and niobium, said bar being disposed within said sheath and projecting beyond the open end thereof and said sheath being metallically bonded to the surface of said bar.

References Cited by the Examiner

UNITED STATES PATENTS

| 2,593,741 | 4/52 | Ferrand | 204—246 |
| 2,636,856 | 4/53 | Suggs et al. | 204—290 |

FOREIGN PATENTS

| 162,900 | 5/54 | Australia. |
| 868,031 | 2/53 | Germany. |

JOHN H. MACK, *Primary Examiner.*